United States Patent
Sung

(10) Patent No.: US 6,654,065 B1
(45) Date of Patent: Nov. 25, 2003

(54) APPARATUS FOR GENERATING TIMING AND SYNCHRONIZING SIGNALS FOR A DIGITAL DISPLAY DEVICE

(75) Inventor: Ki Cheol Sung, Shihung-shi (KR)

(73) Assignee: LG Electronics Inc., Seoul (KR)

( * ) Notice: Subject to any disclaimer, the term of this patent is extended or adjusted under 35 U.S.C. 154(b) by 309 days.

(21) Appl. No.: 09/651,079

(22) Filed: Aug. 30, 2000

(30) Foreign Application Priority Data

Aug. 31, 1999 (KR) .......................................... P99-36718

(51) Int. Cl.⁷ ............................................. H04N 9/475
(52) U.S. Cl. .................... 348/525; 348/508; 348/516
(58) Field of Search ............................... 348/500, 508, 348/510, 512, 514, 516, 517, 520, 521, 522, 523, 525, 527, 529, 531, 540, 542, 547; H04N 9/475

(56) References Cited

U.S. PATENT DOCUMENTS

| 5,686,968 A | * | 11/1997 | Ujiie et al. | 348/521 |
|---|---|---|---|---|
| 5,798,799 A | * | 8/1998 | Jordan et al. | 348/552 |
| 5,861,879 A | * | 1/1999 | Shimizu et al. | 345/213 |
| 5,926,602 A | * | 7/1999 | Okura | 386/13 |
| 6,064,443 A | * | 5/2000 | Lee | 348/530 |
| 6,072,533 A | * | 6/2000 | Nakajima | 348/521 |
| 6,177,922 B1 | * | 1/2001 | Schiefer et al. | 345/698 |
| 6,271,888 B1 | * | 8/2001 | Lares et al. | 348/521 |
| 6,297,850 B1 | * | 10/2001 | Han et al. | 348/521 |

FOREIGN PATENT DOCUMENTS

| JP | 8-160903 | 6/1996 |
|---|---|---|
| JP | 7-175437 | 7/1996 |

OTHER PUBLICATIONS

Korean search report (2 pp.) dated Jun. 22, 2001 (No Translation).

* cited by examiner

Primary Examiner—John Miller
Assistant Examiner—Brian Yenke
(74) Attorney, Agent, or Firm—Fleshner & Kim, LLP

(57) ABSTRACT

A standard signal processing apparatus for a digital display that is adaptive for a digital display device. In the apparatus, a synchronizing signal/image signal separator separates an input signal into a composite synchronizing signal and image signals. A synchronizing signal separator separates the composite synchronizing signal into horizontal and vertical synchronizing signals. A clock generator generates a clock signal using any one of the horizontal synchronizing signal and the composite synchronizing signal. A display receives the clock signal, the image signals and the horizontal and vertical synchronizing signals to display a picture.

12 Claims, 6 Drawing Sheets

APPARATUS FOR GENERATING TIMING AND SYNCHRONIZING SIGNALS FOR A DIGITAL DISPLAY DEVICE

BACKGROUND OF THE INVENTION

1. Field of the Invention

This invention relates to a display device, and more particularly to a standard signal processing apparatus suitable for a digital display device

2. Description of the Related Art

Generally, a display device transmits synchronizing signals H and V along with image signals to a display panel to display a picture. To this end, the display device requires three data transmission lines R, G and B for transmitting a data for each of red(R), green(G) and blue(B) signals involved in the image signals and two synchronizing transmission lines for transmitting the synchronizing signals H and V.

However, as the number of signal transmission lines for the image signals R, G and B and the synchronizing signals H and V goes larger in the display device, a band width is more reduced. In order to solve the problem concerning the reduction in the band width, the display device employs a synchronous on green (SOG)/composite (COMP) signal processing system. The COMP system is a system of transmitting two synchronizing signals H and V over a single line, which makes an exclusive logical sum operation of the vertical synchronizing signal V and the horizontal synchronizing signal H to generate a composite synchronizing signal HV. Accordingly, since the COMP system transmits the composite synchronizing signal HV over a single line, the image signals R, G and B and the composite synchronizing signal HV is transmitted to the display panel using total four lines including three lines for a transmission of the R, G and B image signals.

The SOG system is a transmission system of carrying the composite synchronizing signal HV in a line transmitting a green(G) image signal of the three lines used to transmit the R, G and B image signals. Since the SOG system transmits the composite synchronizing signal HV and the green(G) image signal over a single line, it requires total three lines for a transmission of the R, G and B image signals and the H and B synchronizing signals.

Referring to FIG. 1, the conventional standard signal processor includes a synchronizing signal/image signal separator 2 for receiving a SOG/COMP signal from an input terminal 1 to separate it into a composite synchronizing signal HV and image signals R, G and B, a synchronizing signal separator 4 for separating the composite synchronizing signal HV from the synchronizing signal/image signal separator 2 into a vertical synchronizing signal V and a horizontal synchronizing signal H, and a display 6 for displaying the image signals R, G and B from the synchronizing signal/image signal separator 2 in accordance with the synchronizing signals H and V from the synchronizing signal separator 4. The synchronizing signal/image signal separator 2 separates a SOG/COMP signal inputted from the input terminal 1 into the composite synchronizing signal HV and the image signals R, G and B. The image signals separated from the synchronizing signal/image signal separator 2 are transmitted to the display 6, and the composite synchronizing signal HV is transmitted to the synchronizing signal separator 4. The synchronizing signal separator 4 separates the composite synchronizing signal HV transmitted from the synchronizing signal/image signal separator 2 into horizontal and vertical synchronizing signals H and V. The horizontal and vertical synchronizing signals H and V separated from the synchronizing signal separator 4 are transmitted to the display 6. The display 6 is synchronized with the horizontal and vertical synchronizing signals H and V inputted from the synchronizing signal separator 4 to display a picture corresponding to the image signals R, G and B. The standard signal processor having the configuration as mentioned above is applicable to an analog system display device. A digital driving is needed with the development of a display device technique. Accordingly, a novel standard signal processor suitable for a digital driving is required.

SUMMARY OF THE INVENTION

Accordingly, it is an object of the present invention to provide, a standard signal processing apparatus for a digital display that is adaptive for a digital display device.

In order to achieve these and other objects of the invention, a standard signal processing apparatus for a digital display according to an embodiment of the present invention includes a synchronizing signal/image signal separator for separating an input signal into a composite synchronizing signal and image signals; a synchronizing signal separator for separating the composite synchronizing signal into the horizontal and vertical synchronizing signals; a clock generator for generating a clock signal using any one of the horizontal synchronizing signal and the composite synchronizing signal; and a display for receiving the clock signal, the image signals and the horizontal and vertical synchronizing signals to display a picture.

A standard signal processing apparatus for a digital display according to another embodiment of the present invention includes a synchronizing signal/image signal separator for separating the input signal into a composite synchronizing signal and image signals; a synchronizing signal separator for receiving the composite synchronizing signal to extract a first vertical synchronizing signal; a clock generator for receiving the composite synchronizing signal to generate a clock signal; a matcher for generating a horizontal synchronizing signal synchronized with the clock signal and a second vertical synchronizing signal synchronized with the horizontal syhnchronizing signal and for converting the image signals into a digital data; and a display for receiving the horizontal synchronizing signal, the second vertical synchronizing signal, the digital data and the clock signal to display a picture.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE PREFERRED EMBODIMENT

Figure 1:
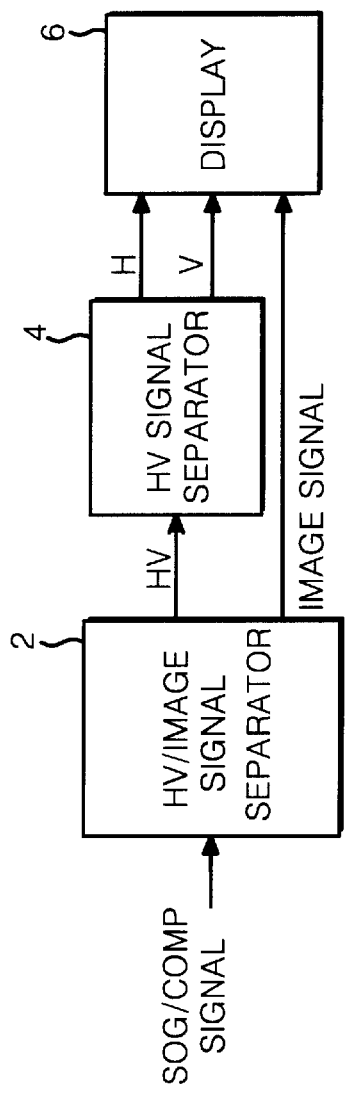
FIG. 1 is a block diagram showing a configuration of a conventional standard signal processor of analog system.
Figure 2:
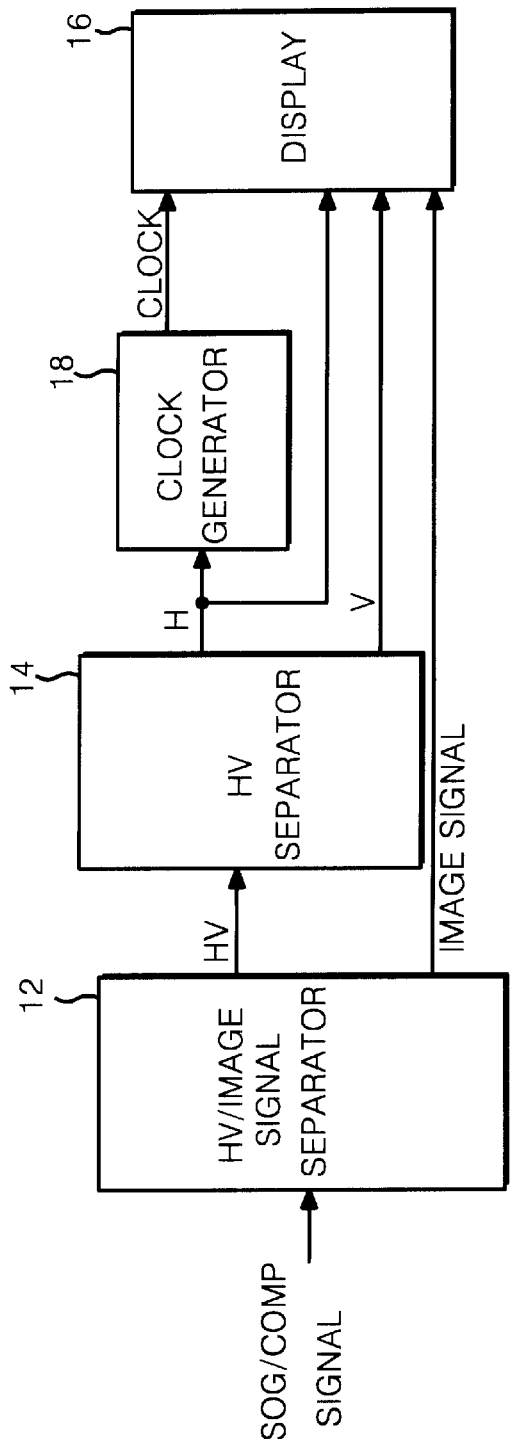
FIG. 2 is a block diagram showing a configuration of a standard signal processor according to a first embodiment of the present invention.
Figure 3:
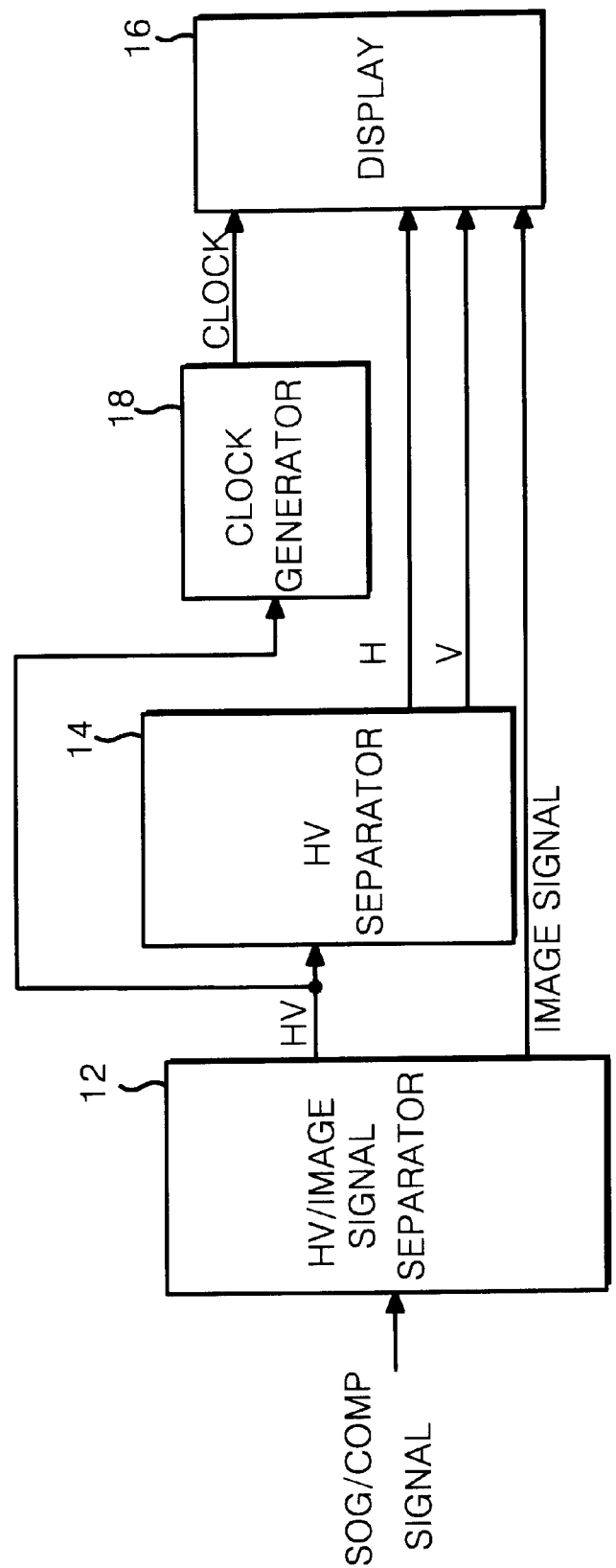
FIG. 3 is a block diagram showing a configuration of a standard signal processor according to a second embodiment of the present invention.

Referring to FIG. 2, there is shown a standard signal processor for a digital display device according to a first embodiment of the present invention. The standard signal processor includes a synchronizing signal/image signal processor 12 for receiving a SOG/COMP signal from an input terminal 11 to separate it into a composite synchronizing signal HV and image signals R, G and B, a synchronizing signal separator 14 for separating the composite synchronizing signal HV from the synchronizing signal/image signal separator 12 into a vertical synchronizing signal V and a horizontal synchronizing signal H, a clock signal generator 18 for receiving the horizontal synchronizing signal H from the synchronizing signal separator 14 to generate a clock signal, and a display 16 for receiving the clock signal, the horizontal synchronizing signal H, the vertical synchronizing signal V and the image signals R, G and B to display a picture. The synchronizing signal/image signal -separator 12 separates a SOG/COMP signal inputted from the input terminal 11 into the composite synchronizing signal HV and the image signals R, G and B. The image signals separated from the synchronizing signal/image signal separator 12 are transmitted to the display 16, and the composite synchronizing signal HV is transmitted to the synchronizing signal separator 14. The synchronizing signal separator 14 separates the composite synchronizing signal HV transmitted from the synchronizing signal/image signal separator 12 into horizontal and vertical synchronizing signals H and V. The horizontal synchronizing signal H separated from the synchronizing signal separator 14 is transmitted to the clock generator 18 and the display 16 while the vertical synchronizing signal V is transmitted to the display 16. The clock generator 18 generates a clock signal on a basis of the horizontal synchronizing signal H inputted from the synchronizing signal separator 14. The display 16 is synchronized with the clock signal inputted from the clock generator 18 and the horizontal and vertical synchronizing signals H and V inputted from the synchronizing signal separator 14 to display a picture corresponding to the image signals R, G and B. The standard signal processor having the configuration as mentioned above is applicable to an analog system display device. The standard signal processor according to the first embodiment having the configuration as mentioned above is applicable to a digital system display device. However, when the horizontal and vertical synchronizing signals. H and V are separated from the synchronizing separator 14 in the standard signal processor according to the first embodiment of the present invention, the horizontal synchronizing signal H may be deteriorated. Due to such a deterioration of the horizontal synchronizing signal H, the clock signal generated from the horizontal synchronizing signal H causes a phase change. Thus, when a picture is displayed on the display 16, a jitter having an unstable shake in the horizontal direction is generated. In order to overcome this problem, a standard signal processor according to the second embodiment of the present invention as shown in FIG. 3 generates a clock signal using a composite synchronizing signal HV outputted from a synchronizing signal/image signal separator 12. In other words, a clock generator 18 generates a clock signal using the composite synchronizing signal that does not pass through a synchronizing signal generator 14. Accordingly, the second embodiment of the present invention is capable of minimizing a jitter phenomenon generated due to a deterioration of the horizontal synchronizing signal H.

Figure 4:
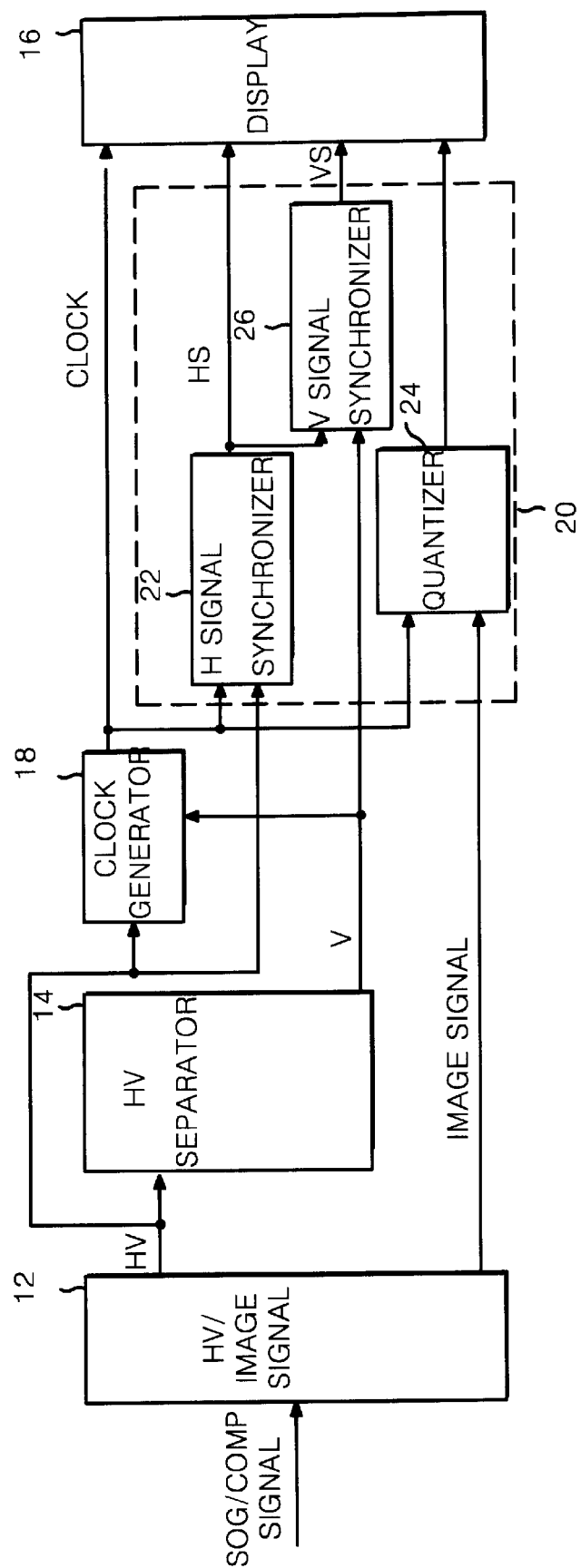
FIG. 4 is a block diagram showing a configuration of a standard signal processor according to a third embodiment of the present invention.

Referring to FIG. 4, there is shown a standard signal processor for a digital display device according to a third embodiment of the present invention. The standard signal processor includes a synchronizing signal/image signal processor 12 for receiving a SOG/COMP signal from an input terminal 11 to separate it into a composite synchronizing signal HV and image signals R, G and B, a synchronizing signal separator 14 for extracting a vertical synchronizing signal V included in the composite synchronizing signal HV from the synchronizing signal/image signal 12, a clock generator 18 for receiving the composite synchronizing signal HV from the synchronizing signal/image signal separator 12 to generate a clock signal, a matcher 20 for generating horizontal and vertical synchronizing signals HS and VS synchronized with the clock signal inputted from the clock generator 18 and for converting the image signals R, G and B inputted from the synchronizing signal/image signal separator 12 into a digital data, and a display 16 for receiving the clock signal, the digital data and the synchronized horizontal synchronizing signals HS and VS to display a picture. The synchronizing signal/image signal separator 12 separates a SOG/COMP signal into the composite synchronizing signal HV and the image signals R, G and B. The synchronizing signal separator 14 extracts the vertical synchronizing signal V included in the composite synchronizing signal HV. The clock generator 18 receives the composite synchronizing signal HV from the synchronizing signal/image signal separator 12 and the vertical synchronizing signal from the synchronizing signal separator 14 to generate a clock signal. At this time, the clock generator 18 generates a clock signal using the composite synchronizing signal in a time interval other than a blanking interval of the vertical synchronizing signal V to apply the same to the display 16. On the other hand, the clock generator 18 is driven on a free-run basis when the vertical synchronizing signal corresponding to the blanking interval is input to internally generate a clock signal in the blanking interval, thereby applying the clock signal to the display 16.

The matcher 20 includes a horizontal signal synchronizer 22 for generating a horizontal synchronizing signal HS synchronized with the clock signal, a vertical signal synchronizer 26 for generating a vertical synchronizing signal VS synchronized with the horizontal synchronizing signal HS generated from the horizontal signal synchronizer 22, and a quantizer 24 for receiving the image signals R, G and B inputted from the synchronizing signal/image signal separator 12 to generate a digital data. The horizontal signal synchronizer 22 receives the clock signal from the clock generator 18 and the composite synchronizing signal HV from the synchronizing signal/image signal separator 12 to generate the horizontal synchronizing signal HS synchronized with the clock signal. The horizontal synchronizing signal HS generated from the horizontal signal synchronizer 22 is transmitted to the display 16 and the vertical signal synchronizer 26. The vertical signal synchronizer 26 receives the horizontal synchronizing signal HS from the horizontal signal synchronizer 22 and the vertical synchronizing signal V from the synchronizing signal separator 14 to generate the vertical synchronizing signal VS synchronized with the vertical synchronizing signal HS. The vertical synchronizing signal VS generated from the vertical signal synchronizer 26 is transmitted to the display 16. The quantizer 24 receives the clock signal from the clock generator 18 and the image signals R, G and B from the synchronizing signal/image signal separator 12. The quantizer 24 receiving the clock signal and the image signals R, G and B quantizes the image signals R, G and B on a basis of the clock signal to generate a digital data. The digital data generated from the quantizer 24 is transmitted to the display 16. The display 16 is synchronized with the clock signal inputted from the clock generator 18, the horizontal synchronizing signal HS inputted from the horizontal signal synchronizer 22 and the vertical synchronizing signal VS inputted from the, vertical signal synchronizer 26 to display a picture corresponding to the digital data inputted from the quantizer 24.

Figure 5:
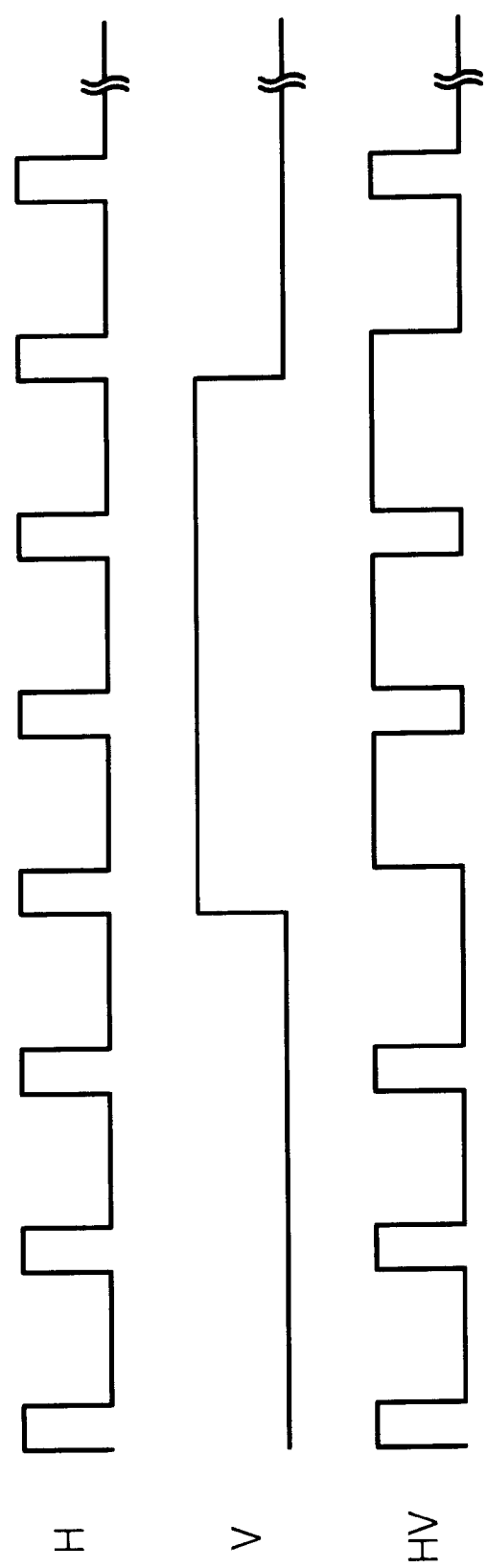
FIG. 5 is waveform diagrams for showing a generation process of a composite image signal inputted to the input terminal in FIG. 4.
Figure 6:
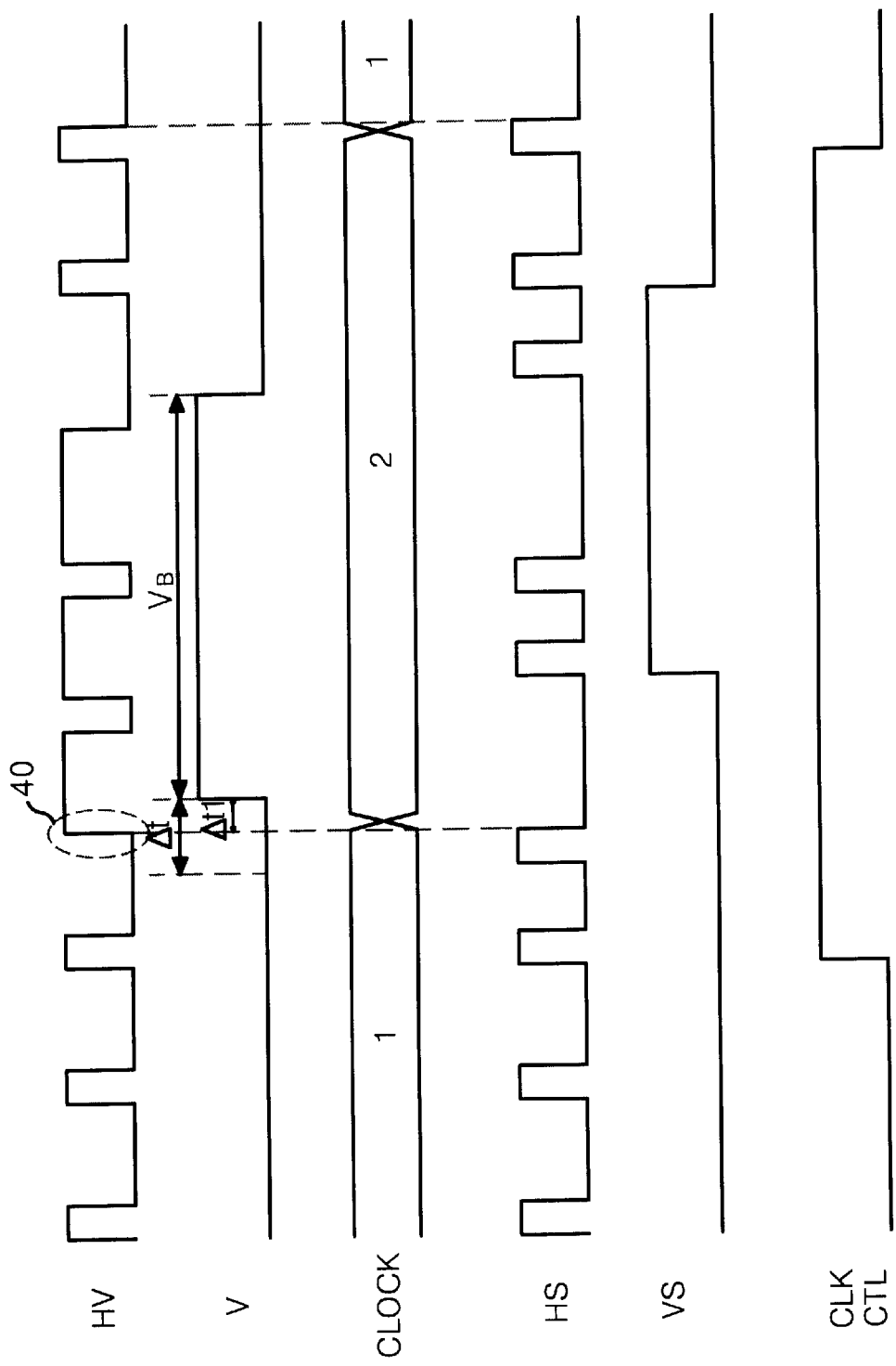
FIG. 6 is waveform diagrams for showing signal waveforms generated from the standard signal processor of FIG. 4.

FIG. 5 and FIG. 6 are waveform diagrams representing signal waveforms generated from the standard signal processor for the digital display according to the third embodiment of the present invention shown in FIG. 4. Referring to FIG. 5 and FIG. 6, the composite synchronizing signal HV inputted, via the input terminal 11, from the synchronizing signal/image signal separator 12 is generated by an exclusive logical sum operation of the horizontal synchronizing signal H and the vertical synchronizing signal V. The synchronizing signal separator 14 extracts the vertical synchronizing signal V from the composite synchronizing signal HV using the composite synchronizing signal HV. The vertical synchronizing signal V generated in this manner emerges as a signal delayed by a desired time Δt in comparison to an original signal. The vertical synchronizing signal V is generated at a high level only in a blanking interval $V_B$. The clock generator 18 generates a clock using the composite synchronizing signal HV. In the composite synchronizing signal, a period in the blanking interval VB of the vertical synchronizing signal V is different from that in the other interval. Accordingly, the clock 2 generated in the blanking interval $V_B$ of the composite synchronizing signal becomes different from the clock 2 generated in the other interval. In order to prevent this clock distortion phenomenon, the clock generator 18 uses the vertical synchronizing signal V as a free-run enable signal. In other words, the clock generator 18 internally generates a clock signal in the blanking interval $V_B$ of the vertical synchronizing signal V to apply the same to the display 16. At this time, a frequency of the clock signal generated from the clock generator 18 is equal to that of the clock signal prior to the blanking interval $V_B$. However, since the vertical synchronizing signal V used as the free-run enable signal is extracted from the composite synchronizing signal HV, it emerges after a desired time Δt1 from a time 40 at which a period of the composite synchronizing signal HV becomes different. For this reason, it is unable to prevent a distortion of the clock signal completely. The horizontal synchronizing signal HS generated on a basis of the clock signal has a different period in a time interval 2 when the clock signal is distorted. Thus, when a picture is displayed on the display 16, a picture twist phenomenon may be generated. In order to overcome this picture twist phenomenon, a standard signal processor for a digital display according to a fourth embodiment of the present invention further includes a free-run signal generator 30.

Figure 7:
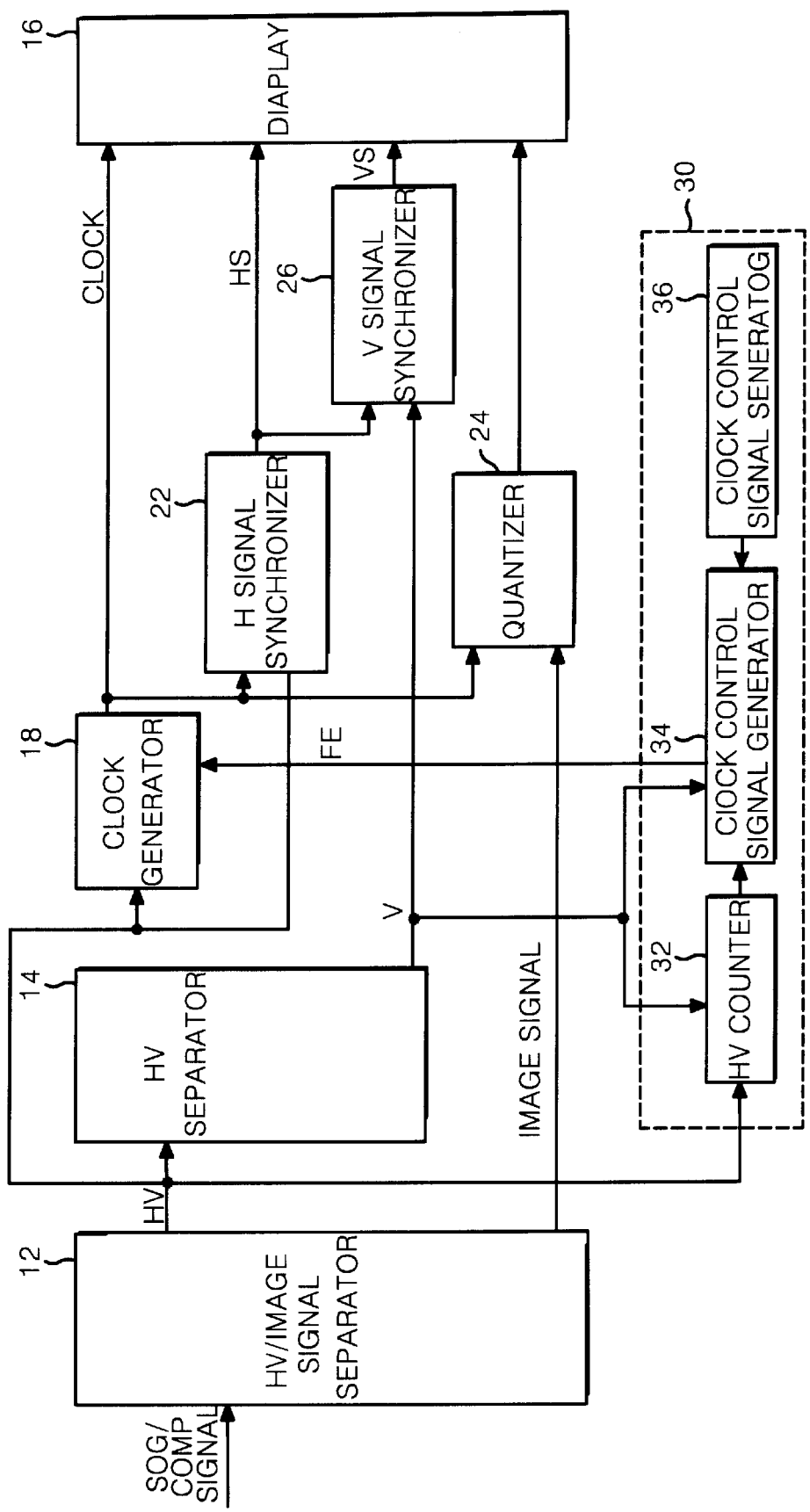
FIG. 7 is a block diagram showing a configuration of a standard signal processor according to a fourth embodiment of the present invention.

Referring now to FIG. 7, the free-run signal generator 30 includes a composite synchronous counter 32 for counting the number of composite synchronizing signals HV, a clock control signal setting unit 36 in which the number of composite synchronizing signals HV has been set, and a clock control signal generator 34 for generating a free-run enable signal FE when the number of composite synchronizing signals HV counted from the composite synchronous counter 32 is equal to a value set in the clock signal setting unit 36. The composite synchronous counter 32 receives the composite synchronizing signal HV from the synchronizing signal/image signal separator 12 and the vertical synchronizing signal V from the synchronizing signal separator 14. The composite synchronous counter 32 receiving the composite synchronous signal HV and the vertical synchronizing signal V counts the composite synchronizing signal HV on a basis of the vertical synchronizing signal V. A value of a time when the free-run enable signal FE begins to be generated and a value of a time when the generated free-run enable signal FE is terminated, are stored in the clock control signal setting unit 36. For example, if the free-run enable signal FE is generated after 1300 composite synchronizing signals HV have been input and the generation of the free-run enable signal FE is stopped after 30 composite synchronizing signals HV have been input, then values of 1300 and 30 are stored in the clock control signal setting unit 36. In this case, a start value of the free-run enable signal FE stored in the clock control signal setting unit 36 is set to generate the free-run enable signal FE prior to one period from a time 40 when a period of the composite synchronizing signal HV becomes different. Also, an end time of the free-run enable signal FE stored in the clock control signal setting unit 36 is set to have a larger period than the blanking interval $V_B$ of the vertical synchronizing signal V. The clock control signal generator 34 compares a counted value of the composite synchronizing signals HV inputted from the composite synchronous counter 32 with a value inputted from the clock control signal setting unit 36 to generate the free-run enable signal FE. The free-run enable signal FE from the clock control signal setting unit 34 is applied to the clock generator 18. The clock control signal generator 34 is driven on a free-run basis when a high-level free-run enable signal FE is input, and cancels the free-run state when a low-level free-run enable signal FE is input. Such a configuration can prevent a twist phenomenon of the display 16 caused by the clock distortion.

As described above, the standard signal processor for the digital display according to the present invention is adaptive for a digital display device that processes the SOG/COMP signal by the digital system. Also, the present standard signal processor is applicable to all the system processing the SOG/COMP signal on a digital basis. In other words, the present standard signal processor is applicable to all the system supporting the SOG/COMP signal such as PDP, LCD and FED, etc.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A standard signal processing apparatus for a digital display which receives an input signal including a composite synchronizing signal having horizontal and vertical synchronizing signals and image signals to display a picture, said apparatus comprising:
   a synchronizing signal/image signal separator for separating the input signal into the composite synchronizing signal and the image signals;
   a synchronizing signal separator for receiving the composite synchronizing signal to extract a first vertical synchronizing signal;

a clock generator for receiving the composite synchronizing signal to generate a clock signal;

a matcher for generating a horizontal synchronizing signal synchronized with the clock signal and a second vertical synchronizing signal synchronized with the horizontal synchronizing signal and for converting the image signals into a digital data; and a display for receiving the horizontal synchronizing signal, the second vertical synchronizing signal, the digital data and the clock signal to display a picture.

2. The standard signal processing apparatus as claimed in claim 1, wherein the matcher comprises:

a horizontal signal synchronizer for receiving the clock signal and the composite synchronizing signal to generate the horizontal synchronizing signal synchronized with the clock signal;

a vertical signal synchronizer for receiving the horizontal synchronizing signal and the vertical synchronizing signal to generate the second vertical synchronizing signal synchronized with the horizontal synchronizing signal; and a quantizer for receiving the clock signal and the image signals to quantize the image signals in accordance with the clock signal, thereby generating the digital data.

3. The standard signal processing apparatus as claimed in claim 1, wherein the clock generator receives the first vertical synchronizing signal to generate the clock signal using the composite synchronizing signal when the first vertical synchronizing signal has a first logical value and to generate the clock signal for himself when the first vertical synchronizing signal has a second logical value.

4. The standard signal processing apparatus as claimed in claim 3, wherein a frequency of the clock signal-generated when the first vertical synchronizing signal has the second logical value is equal to that of the clock signal generated using the composite synchronizing signal.

5. The standard signal processing apparatus as claimed in claim 3, wherein a frequency of the clock signal generated when the first vertical synchronizing signal has the second logical value is equal to that of the previous clock signal.

6. The standard signal processing apparatus as claimed in claim 1, further comprising:

a free-run signal generator for receiving the composite synchronizing signal and the first vertical synchronizing signal to generate a free-run enable signal inputted to the clock generator.

7. The standard signal processing apparatus as claimed in claim 6, wherein the free-run signal generator comprises:

a composite synchronous counter for counting the composite synchronizing signal;

a clock control signal setting unit for setting a generation interval of the free-run enable signal; and a clock control signal generator for generating a free-run enable signal having a second logical value when the counted value of the composite synchronizing signal corresponds to the generation interval of the free-run enable signal and for generating a free-run enable signal having a first logical value in the other interval.

8. The standard signal processing apparatus as claimed in claim 7, wherein the clock generator receives the free-run enable signal to generate the clock signal using the composite synchronizing signal when the free-run enable signal has a first logical value and to generate the clock signal for himself when the free-run enable signal has a second logical value.

9. The standard signal processing apparatus as claimed in claim 8, wherein a frequency of the clock signal generated when the free-run enable signal has the second logical value is equal to that of the clock signal generated using the composite synchronizing signal.

10. The standard signal processing apparatus as claimed in claim 8, wherein a frequency of the clock signal generated when the free-run enable signal has the second logical value is equal to that of the previous clock signal.

11. The standard signal processing apparatus as claimed in claim 8, wherein the clock control signal setting unit is set to generate a free-run enable signal having the second logical value prior to one period from a time when a period of the composite synchronizing signal becomes different.

12. The standard signal processing apparatus as claimed in claim 8, wherein the clock control signal setting unit is set to have such a period that the second logical value of the free-run enable signal is larger than the second logical value of the first vertical synchronizing signal.

* * * * *